United States Patent
Hikima (10) Patent No.: US 6,519,214 B1
(45) Date of Patent: Feb. 11, 2003

(54) PREPIT DETECTING APPARATUS

(75) Inventor: Hiroshi Hikima, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/407,704

(22) Filed: Sep. 28, 1999

(30) Foreign Application Priority Data

Sep. 30, 1998 (JP) .......................................... 10-278709

(51) Int. Cl.⁷ ................................................ G11B 7/00
(52) U.S. Cl. .............................. 369/44.26; 369/124.07; 369/124.15; 369/44.34
(58) Field of Search ......................... 369/124.12, 44.34, 369/44.35, 44.42, 44.13, 124.1, 124.15

(56) References Cited

U.S. PATENT DOCUMENTS

| | | | |
|---|---|---|---|
| 5,339,302 A | | 8/1994 | Takahashi et al. |
| 5,459,706 A | * | 10/1995 | Ogawa et al. ................. 369/54 |
| 5,610,887 A | * | 3/1997 | Arai et al. ................ 369/44.36 |
| 5,696,752 A | * | 12/1997 | Hajjar et al. ................ 369/124 |
| 5,717,579 A | * | 2/1998 | Mashimo et al. ........... 369/124 |
| 6,314,075 B2 | * | 11/2001 | Miyamoto et al. ..... 369/124.07 |

* cited by examiner

*Primary Examiner*—Nabil Hindi
(74) *Attorney, Agent, or Firm*—Sughrue Mion, PLLC (57) ABSTRACT

A prepit detecting apparatus which uses an optical recording medium having information recording tracks on which information is recorded and guide tracks each of which guides a light beam to the information recording track and on which prepits for saving pre-information are formed such that the light beam is applied to the information track of the optical recording medium, the prepit detecting apparatus comprising: light receiving means divided into a first divided light receiving portion and a second divided light receiving portion divided along an optically parallel division line in a direction of tangent of the information tracks and arranged to receive reflected light of the light beam with which the optical recording medium has been irradiated; and a difference calculator for calculating the difference between a first read signal output from the first divided light receiving portion and a second read signal output from the second divided light receiving portion so that the prepit is detected in response to a differential signal output from the difference calculator, wherein the difference calculator incorporates amplitude correction means for causing the amplitudes of the first read signal and the second read signal to coincide with a reference level, and the difference between the first read signal and the second read signal corrected by the amplitude correction means is calculated.

10 Claims, 10 Drawing Sheets

PREPIT DETECTING APPARATUS

BACKGROUND OF THE INVENTION

1. Field of the Invention

The present invention relates to a prepit detecting apparatus arranged to detect prepit information in an optical recording/reproducing apparatus for recording/reproducing information with respect to a recording-enabled optical recording medium having pre-information, such as address information, in the form of prepits.

2. Description of the Related Art

In general, a recording-enabled optical recording medium is enabled to record information on an optical recording medium on which no information has been recorded by recording address information and reference signals for generating a clock signal for use in a recording/reproducing operation in the form of prepits and pregrooves. A DVD-R (Digital Versatile Disc-Recordable) has energetically been researched and developed, the DVD-R being a recording medium which is capable of recording information in a quantity which is about seven times information which can be recorded on the CD. The DVD-R has pregrooves which are regions on which information, such as video data and audio data, which must be recorded is recorded as recording pits. Moreover, the DVD-R has prepits (hereinafter called land prepits (LPP)) in land portions which are regions formed among the foregoing pregrooves. The LPP is formed on a straight line which perpendicularly intersect the direction of a tangent of the pregrooves such that the land prepits are not formed adjacent to each other across a pregrooves. The pregrooves are slightly swung (wobbled) in the radial direction of the disc at a frequency based on a reference clock which is used to control the rotation of the DVD-R. When the rotation of the DVD-R is controlled, the wobbling frequency is detected. Thus, feedback control is performed in such a manner that the detected wobbling frequency coincides with the frequency of the reference clock.

The LPP is detected such that reflected light of a light beam with which the pregrooves has been irradiated is received by a light receiving device divided into two sections at least along a division line optically parallel with the direction of a tangent of the pregrooves. Moreover, the difference of output signals from the regions (the divided regions) of the light receiving device in a direction perpendicular to the pregrooves is calculated. The obtained differential signal is compared with a predetermined threshold so that the LPP is detected as a binary signal (hereinafter called an "LPP signal"). When the recording medium is an optical disc, the divided regions of the light receiving device are formed in the radial direction of the disc owing to the foregoing division line. Therefore, the foregoing differential signal is called a "radial push-pull signal".

The reason why the LPP can be detected by using the radial push-pull signal is that the LPP is formed as described above such that the level does not exist in adjacent land portions on a straight line which perpendicularly intersects the direction of tangent of the pregroove. That is, when one pregroove is irradiated with a light beam, reflection components of the LPP do not simultaneously exist in light reflected from the two side land portions (the LPP component exists in only reflected light from either of the land portions). Thus, the foregoing calculation for obtaining the difference enables only the component of light reflected from the LPP to be extracted. Usually, only either (for example, the positive pole component) of the two polar components obtained by the calculation for obtaining the difference is compared with the predetermined threshold. An obtained binary signal is employed as the LPP signal.

A record-enabled optical recording medium, such as the DVD-R, encounters reduction in the reflectance owing to thermal energy of a recording beam when a high output light beam is applied to form the recording pit for storing information. That is, the quantity of light reflected from the position of a pregroove in which the recording pit has been formed (which has been irradiated with the recording beam) is smaller than the quantity of light reflected from the position of a pregroove having no recording pit. If the recording beam is also used as the reproducing beam (when the recording beam is used as the reproducing beam, a low output is employed) or if a tracking error signal can be generated by one beam, the structure of a recording/reproducing apparatus can conveniently be simplified. Therefore, the diameter of the recording beam is usually adjusted to be slightly larger than the width of the pregroove. Thus, when information is recorded, also a portion of the land adjacent to the position of the pregroove on which the recording pit for storing information is formed is irradiated with the recording beam. Therefore, if an LPP exists in the land portion adjacent to the position of the pregroove on which the recording pit is formed, the following problem arises when the LPP is read after the recording pit has been formed.

That is, irradiation with the high-output recording beam for the purpose of forming the recording pit causes the reflectance of the land portion having the LPP to be reduced. Therefore, when the LPP is read, the quantity of light reflected from the LPP is reduced. Also the amplitude level of the differential signal of the LPP which is extracted as the radial push-pull signal is lowered. As a result, there arises a problem in that the S/N ratio (signal-to-noise ratio) of the LPP signal with respect to unnecessary noise deteriorates.

On the other hand, the pregrooves are wobbled in the radial direction of the disc as described above. Therefore, the radial push-pull signal is formed into a composite signal in which the prepit is superimposed on the component of the wobbling frequency. A disc, such as the DVD-R, on which information has densely been recorded, sometimes encounters a fact that the component of the wobble signal of a pregroove adjacent to a pregroove which is irradiated with a light beam is leaked and introduced owing to crosstalk. If the foregoing leakage and introduction occur, the component of the wobble signal in the foregoing composite signal is undesirably caused to interfere. Thus, the amplitude is undesirably changed.

That is, the component of the LPP signal is superimposed on the wobble signal having the amplitude which is changed. Since the amplitude of the wobble signal serving as the base-line voltage is undesirably changed, comparison with a fixed slice level for detecting the LPP signal in the form of a binary signal cannot easily be performed.

To overcome the interference of the wobble signal component, for example, a method exists with which the amplitude of the wobble is AM-detected to obtain the amplitude change component. Moreover, the obtained change component is reduced to a slice level for binary-coding the LPP, followed by performing binary coding while following to change in the wobble is being performed.

However, when the foregoing method is employed, an AM wave detecting circuit, a variety of filters and suppression of the LPP component when the wobble amplitude is detected are required. Therefore, the size of the circuit is enlarged excessively. Moreover, setting and adjustment of a quantity of injection of the change in the wobble must be performed. Therefore, there arises a problem in that the operation for adjusting the circuit becomes complicated.

SUMMARY OF THE INVENTION

In view of the foregoing, an object of the present invention is to provide a prepit detecting apparatus having a simple structure and capable of accurately extracting an LPP signal.

To solve the problem, according to one aspect of the present invention, there is provided a prepit detecting apparatus which uses an optical recording medium having information recording tracks on which information is recorded and guide tracks each of which guides a light beam to the information recording track and on which prepits for saving pre-information are formed such that the light beam is applied to the information track of the optical recording medium, the prepit detecting apparatus comprising: light receiving means divided into a first divided light receiving portion and a second divided light receiving portion divided along an optically parallel division line in a direction of tangent of the information tracks and arranged to receive reflected light of the light beam with which the optical recording medium has been irradiated; and a difference calculator for calculating the difference between a first read signal output from the first divided light receiving portion and a second read signal output from the second divided light receiving portion so that the prepit is detected in response to a differential signal output from the difference calculator, wherein the difference calculator incorporates amplitude correction means for causing the amplitudes of the first read signal and the second read signal to coincide with a reference level, and the difference between the first read signal and the second read signal corrected by the amplitude correction means is calculated.

Another aspect of the present invention has a structure that the amplitude correction means incorporates first amplitude extracting means for extracting an average amplitude level of the first read signal, second amplitude extracting means for extracting an average amplitude level of the second read signal, first comparison means for comparing an output of the first amplitude extracting means and an output of the second amplitude extracting means with each other, second comparison means for comparing an output of the second amplitude extracting means and the reference level with each other, first amplitude adjustment means for adjusting the amplitude of the first read signal in accordance with an output of the first comparison means and second adjustment means for adjusting the amplitude of the second read signal in accordance with an output of the second comparison means.

Another aspect of the present invention has a structure that the amplitude correction means incorporates first amplitude extracting means for extracting an average amplitude level of the first read signal, second amplitude extracting means for extracting an average amplitude level of the second read signal, first comparison means for comparing an output of the first amplitude extracting means with a reference level, second comparison means for comparing an output of the second amplitude extracting means with a reference level, first amplitude adjustment means for adjusting the amplitude of the first read signal in accordance with an output of the first comparison means and second adjustment means for adjusting the amplitude of the second read signal in accordance with an output of the second comparison means.

Since the recording pits for storing data are formed, the amplitude correction means corrects reduction in the amplitude of each of the first and second read signals if the quantity of light reflected from the LPP which must be extracted is reduced. Therefore, the LPP signal can accurately be extracted.

According to another aspect of the present invention, there is provided a prepit detecting apparatus arranged to use an optical recording medium which has information recording tracks on which information is recorded, which is wobbled in response to a wobble signal having a predetermined frequency and which has guide tracks for guiding a light beam to the information recording track having prepits for saving pre-information and incorporating light receiving means divided into a first divided light receiving portion and a second divided light receiving portion divided along an optically parallel division line in a direction of tangent of the information tracks and arranged to receive reflected light of the light beam with which the optical recording medium has been irradiated and a difference calculator for calculating the difference between a first read signal output from the first divided light receiving portion and a second read signal output from the second divided light receiving portion so that the prepit is detected in response to a differential signal output from the difference calculator, the prepit detecting apparatus comprising: DC clamping means for clamping the differential signal output from the difference calculator with a DC level; and prepit detecting means which compares an output from the clamping means and a reference slice level with each other to detect the prepit signal, wherein the DC clamping means clamps the wobble signal component corresponding to detection timing of the prepit signal detected by the prepit detecting means to the predetermined DC level.

Another aspect of the present invention has a structure that the DC clamping means incorporates relay means for relaying the differential signal at detection timing of the prepit signal, an integrating circuit for integrating the differential signal supplied through the relay means and superimposing means for superimposing an output of the integrating circuit on the differential signal, and the integrating circuit incorporates a calculation amplifier having a non-inverted input terminal to which a predetermined DC level is input and an integrating capacitor connected between an output terminal of the calculation amplifier and an inverted input terminal.

Therefore, if the base voltage of the first transition of the LPP signal is changed, the LPP can accurately be extracted.

DETAILED DESCRIPTION OF THE PREFERRED EMBODIMENTS

A preferred embodiment of the present invention will now be described with reference to the drawings.

Figure 9:
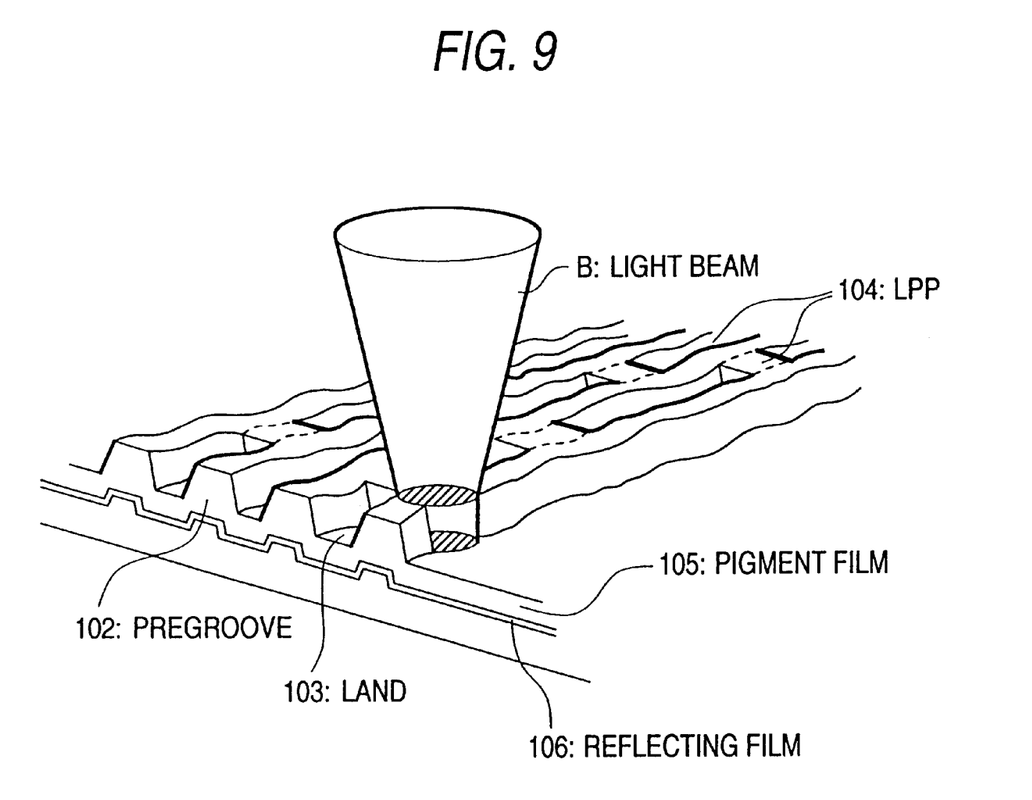
FIG. 9 is a diagram showing an example of a DVD-R having prepits formed on land tracks thereof.

Referring to FIG. 9, the structure of a DVD-R will now be described.

Referring to FIG. 9, the DVD-R disc is a pigment-type DVD-R incorporating a pigment film 105 and permitted to write information only one time. The DVD-R has pregrooves 102 on which information is recorded and lands 103 for guiding light beam B, such as a laser beam, which is reproducing light or recording light to the pregroove 102. Moreover, the DVD-R has a protective film 107 for protecting the foregoing elements and a reflecting surface 106 for reflecting the light beam B when recorded information is reproduced. Moreover, LPP 104 are provided for the lands 103.

The pregrooves 102 of the foregoing DVD-R are wobbled at a frequency corresponding to the rotational speed of the DVD-R disc. When information (pre-information and information, such as image information which must be recorded except for the synchronizing signal), is recorded, an information recording apparatus detects the frequency of wobbling of the pregrooves 102. Thus, a synchronizing signal is obtained to control the rotation of the DVD-R disc to a predetermined rotational speed. Moreover, the LPP 104 is detected to obtain pre-information. In accordance with the pre-information, an optimum output of the light beam B which is the recording light is determined. Moreover, address information which indicates the position on the DVD-R on which information must be recorded is obtained. In accordance with the address information, information which must be recorded is recorded at the corresponding recording position.

When information is recorded, the light beam B is applied in such a manner that the center of the light beam B coincides with the center of the pregroove 102. Thus, recorded information pit corresponding to the information which must be recorded is formed on the pregroove 102. Thus, recorded information is formed. The size of a light spot is determined such that a portion of the light spot is also applied to the land 103 as well as the pregroove 102, as shown in FIG. 9. Reflected light of a portion of the light spot applied to the land 103 is used to detect pre-information from the LPP 104 so as to obtain the pre-information. Moreover, reflected light of the light spot applied to the pregroove 102 is used to detect a wobbling signal from the pregroove 102. Thus, a clock signal for controlling rotation can be obtained.

Figure 10:
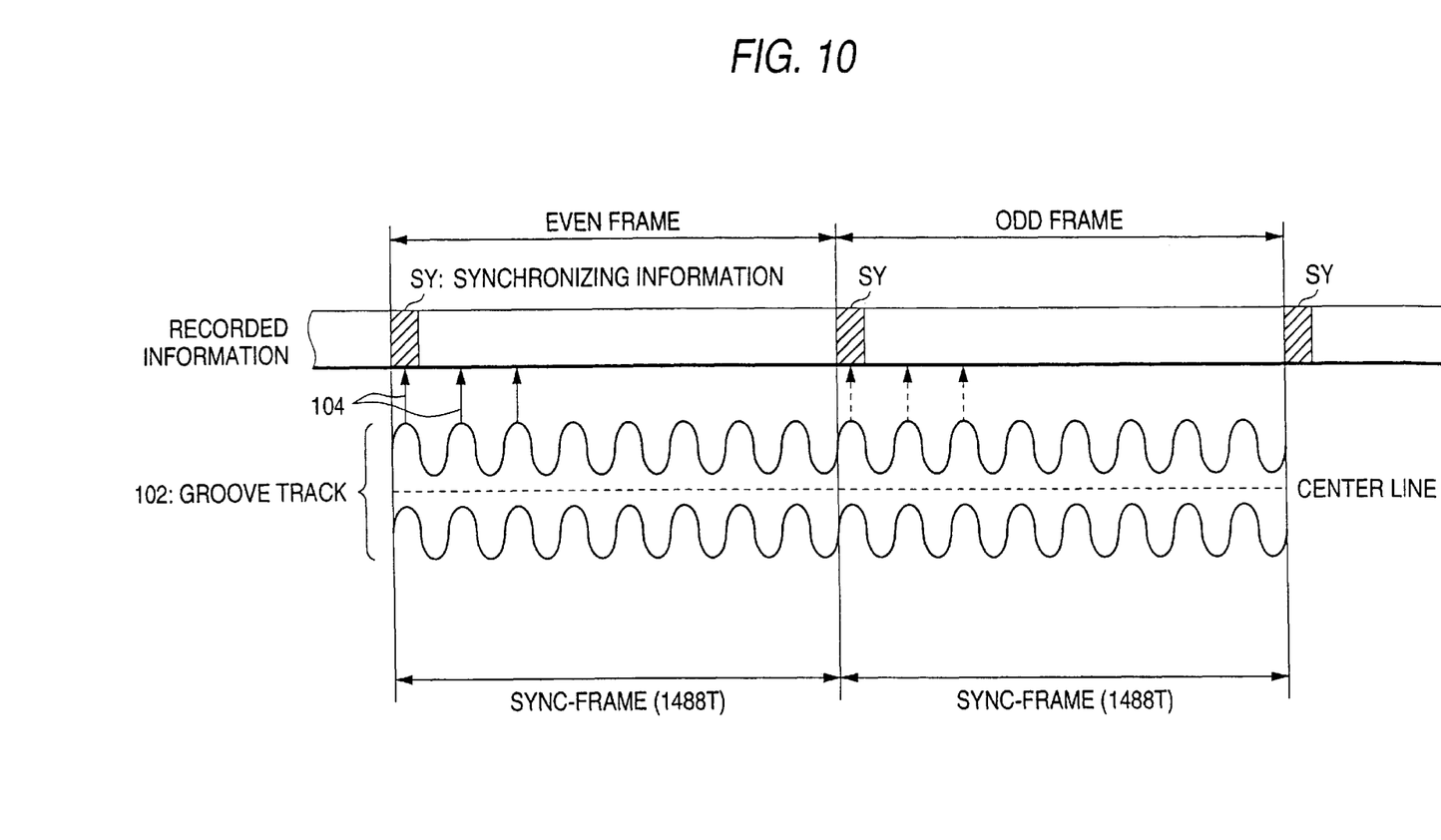
FIG. 10 is a diagram showing a recording format of the DVD-R according to the embodiment.

Recording formats for pre-information and rotation control information previously recorded on the DVD-R will now be described with reference to FIG. 10. The upper portion of FIG. 10 shows the recording format for information which must be recorded, while waves in the lower portion of FIG. 10 show a wobbling state (a plan view of the pregroove 102) on which the information is recorded. Upward arrows between information which must be recorded and the pregrooves 102 schematically indicate positions at which the LPP 104 is formed. The wobbling state of the pregrooves 102 shown in FIG. 10 is illustrated with a greater amplitude as compared with an actual amplitude to cause the illustration to easily be understood. Information which must be recorded is recorded on the center line of the pregroove 102.

As shown in FIG. 10, information which is recorded on the DVD-R is previously divided for each sync-frame. Twenty six sync-frames form one recording sector which is an information unit. Moreover, sixteen recording sectors form one ECC block which is an information block. One sync-frame has a length which is 1488 times (1488T) a unit length (hereinafter called "T") corresponding to a bit interval which is determined in accordance with the recording format when information, which must be recorded, is recorded. In a leading end portion of one sync-frame having a length of 14T, synchronization information SY for synchronization for each sync-frame is recorded.

Pre-information which is recorded on the DVD-R is recorded for each sync-frame. When pre-information is recorded by using the LPP 104, one LPP 104 indicating the synchronizing signal of pre-information must be formed in a land 103 adjacent to a region of each sync-frame for information which must be recorded and on which the synchronization information SY is recorded. Moreover, one or two LPP 104 are formed which indicate the contents (address information) of pre-information which must be recorded in the land 103 adjacent to the front-half portion in the sync-frame except for the synchronization information SY (note that the LPP 104 is not sometimes formed in the front-half portion in the sync-frame except for the synchronization information SY depending on the contents of pre-information which must be recorded. Moreover, three LPP 104 are continuously formed in the front-half portion of the leading sync-frame in one recording sector without exception). At this time, in one recording sector, the LPP 104 is formed in only even-number sync-frames (hereinafter called "EVEN frames") or only odd-number sync-frames (hereinafter called "ODD frames"). Thus, pre-information is recorded. That is, when the LPP 104 is formed in the EVEN frame in a case shown in FIG. 10 (as indicated with upward arrows on a solid line shown in FIG. 10), the LPP 104 is not formed in the adjacent ODD frame.

As for the relationship between wobbling of the pregrooves 102 and the LPP 104, an LPP 104 is formed at the position of a maximum amplitude in the wobbling.

The pregrooves 102 in all of the sync-frames are wobbled at predetermined wobbling frequency of which is 145 kHz (a frequency at which one sync-frame corresponds to eight change waves of the pregrooves 102). The information recording apparatus detects the predetermined wobbling frequency of so that a synchronizing signal for controlling the rotation of a spindle motor 8 for rotating the DVD-R is extracted.

Referring to FIGS. 1 to 8, an embodiment of the prepit detecting apparatus according to the present invention will now be described.

Figure 1:
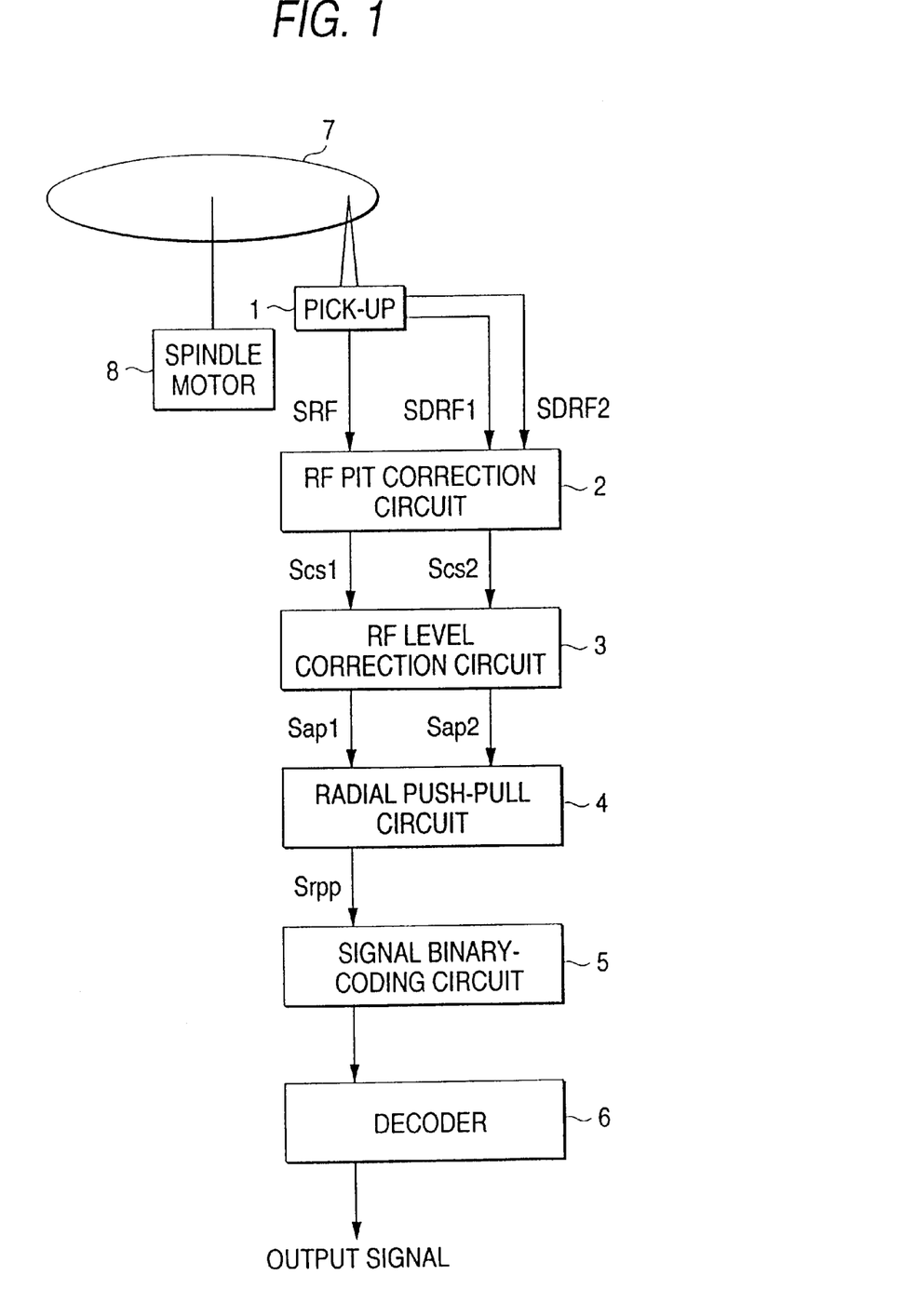
FIG. 1 is a block diagram schematically showing the structure of a prepit detecting apparatus according to an embodiment of the present invention.

FIG. 1 is a block diagram showing the overall shape of the prepit detecting apparatus according to the embodiment of the present invention.

In this embodiment, an assumption is made that recording pits having recorded information have been formed in a portion of pregrooves 102 of the DVD-R.

As shown in FIG. 1, the prepit detecting apparatus according to this embodiment incorporates a DVD-R; the spindle motor 8 for rotating the DVD-R; a pickup 1 which irradiates an information recording surface of the DVD-R which is being rotated with a reproducing beam, which causes a light receiving device (the divided light receiving portions of the light receiving device are called a first divided light receiving portion and a second divided light receiving portion for convenience) divided into two sections in a division line at least optically parallel with a direction of tangent of the pregroove on the DVD-R to receive reflected light of the applied reproducing beam from the information recording surface, which outputs electric signals corresponding to the quantities of light received by the first and second divided light receiving portions as first divided RF signal SDRF1 and second divided RF signal SDRF2 and which outputs the sum of the first divided RF signal SDRF1 and the second divided RF signal SDRF2 as the sum RF signal SRF; an RF pit correction circuit 2 serving as an amplitude correction means for correcting the amplitude level of each of the first and second divided RF signals SDRF1 in accordance with a recording pit component contained in the sum RF signal SRF output from the pickup 1; an RF level correction circuit 3 for uniforming the levels of the divided RF signals corrected by the RF pit correction circuit 2; a radial push-pull signal generating circuit 4 which is a dividing unit for generating radial push-pull signal Srpp which is a differential from the uniformed first and second divided RF signals SDRF2; a prepit detecting circuit 5 which binary-code the generated radial push-pull signal Srpp to detect the same as the LPP signal; and a decoder 6 which decodes the detected LPP signal to extract address information represented by the LPP signal. Address information output from the decoder 6 is supplied to a system control portion (not shown) for totally controlling the prepit detecting apparatus.

The sum RF signal SRF and each of divided RF signals output from the pickup 1 have positive polarity with respect to light reflected from the portion of the DVD-R on which the recording pit has been formed.

An operation of the RF pit correction circuit 2 for processing the signal will now be described with reference to FIGS. 2 and 3.

Figure 2:
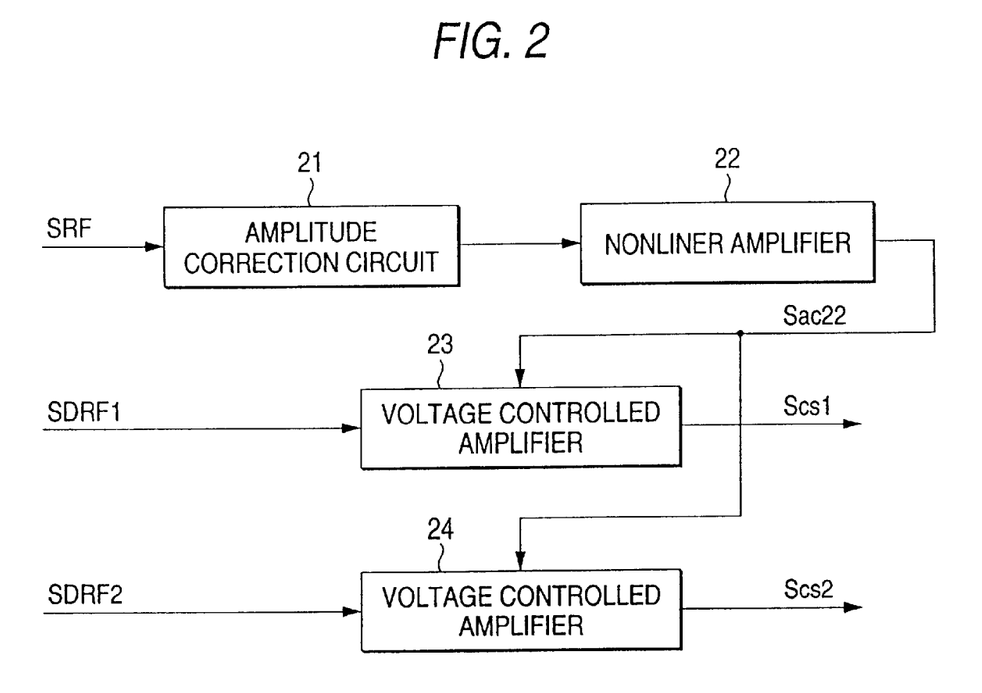
FIG. 2 is a block diagram showing the internal structure of an RF pit correction circuit 2 according to the embodiment of the present invention.

FIG. 2 is a block diagram showing the internal structure of the RF pit correction circuit 2 which incorporates an amplitude correction circuit 21, a nonlinear amplifier 22, a voltage controlled amplifier 23 and a voltage controlled amplifier 24.

The amplitude correction circuit 21 has a function to correct change in the amplitude which is caused from change in the pit length of the recording pit which occurs owing to the spatial frequency characteristic of the pickup 1 and represented by the sum RF signal SRF. In general, the spatial frequency characteristic of the pickup is a low-pass characteristic. That is, as the spatial frequency component of the recording pit which must be read is raised (as the pit length of the recording pit is shortened), the detection performance of the pickup deteriorates. Therefore, the amplitude of the sum RF signal SRF is shortened. Since the length of the recording pit varies according to information which must be recorded, long recording pits and short recording pits (hereinafter called "long pits and short pits" if necessary) are mixed in the sum RF signal SRF. Therefore, the level of the amplitude of the sum RF signal SRF output from the pickup 1 varies according to the length of the recording pit. The amplitude correction circuit 21 corrects the foregoing variation in the amplitude of the sum RF signal SRF owing to the length of the recording pit. The amplitude correction circuit 21, for example, comprises a so-called HBF (High Boost Filter) having the amplification factor which can be enlarged as the frequency of the signal is raised. Therefore, the reduction in the amplitude of the sum RF signal SRF owing to the short pits is corrected by the amplitude correction circuit 21 to have the amplitude which is substantially the same as the amplitude caused from the long pits, and then output to the nonlinear amplifier 22.

Figure 3:
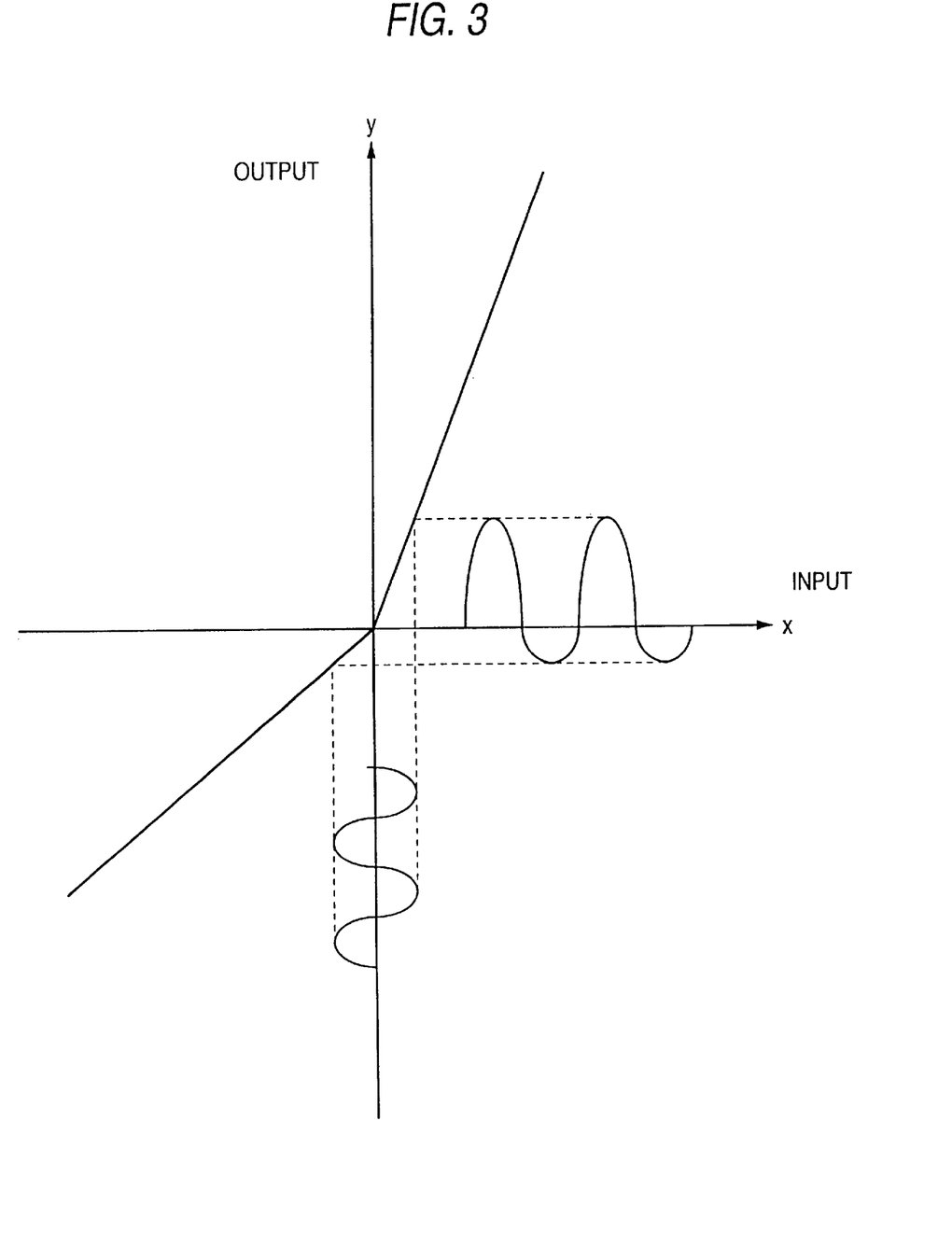
FIG. 3 is a graph showing an input/output characteristic of a nonlinear circuit realized by a circuit realized by approximation using broken lines according to the embodiment of the present invention.

The nonlinear amplifier 22 has an input/output characteristic having nonlinearity realized by approximation using broken lines shown in FIG. 3. Specifically, amplification factor of an input signal with respect to a positive input is larger than the amplification factor with respect to a negative input. A signal input to the foregoing nonlinear amplifier is formed into an output signal, in which the positive amplitude level is emphasized. In this embodiment, the polarity of the sum RF signal SRF is made to be positive with respect to the portion of the DVD-R disc on which the recording pit has been formed. Therefore, the nonlinear amplifier 22 amplifies the signal level of the sum RF signal SRF corresponding to the recording pit so as to have the amplitude which is larger than that of the signal level which does not correspond to the recording pit, that is, the negative polar portion of the sum RF signal SRF. The sum RF signal SRF which has been nonlinear-amplified is output as amplification-factor control signal Sac22 for the voltage controlled amplifiers 23 and 24.

On the other hand, the voltage controlled amplifier 23 amplifies the first divided RF signal SDRF1 supplied from the pickup 1 with the amplification factor represented by the amplification-factor control signal Sac22 supplied from the nonlinear amplifier 22. Specifically, the amplification factor is an amplification factor with which the amplitude is enlarged as the amplitude level of the amplification-factor control signal Sac22 is enlarged. The amplified signal is, as a first correction signal Scs1, output to the following RF level correction circuit 3.

Similarly, the voltage controlled amplifier 24 amplifies the second divided RF signal supplied from the pickup 1 with the amplification factor represented by the amplification-factor control signal Sac22 supplied from the nonlinear amplifier 22. The amplified signal is, as a second correction signal Scs2, output to the following RF level correction circuit 3.

The first and second divided RF signals SDRF2 and the sum RF signal SRF have the same phase. Therefore, the first and second correction signal Scs2 are formed such that the signal level corresponding to the recording pit is emphasized as compared with the signal level which does not correspond to the recording pit, similarly to the amplification-factor control signal Sac22.

The reason why the foregoing biased emphasis is performed will now be described. When a prepit is formed on a land adjacent to a recording pit, a signal component caused from the foregoing prepit is contained in the positive pole portion of the first divided RF signal SDRF1. When the positive pole component of each divided RF signal is emphasized, the S/N of a signal of the prepit contained in a difference signal between the first and second divided RF signal SDRF2 can be improved.

The RF level correction circuit 3 will now be described with reference to FIG. 4.

Figure 4:
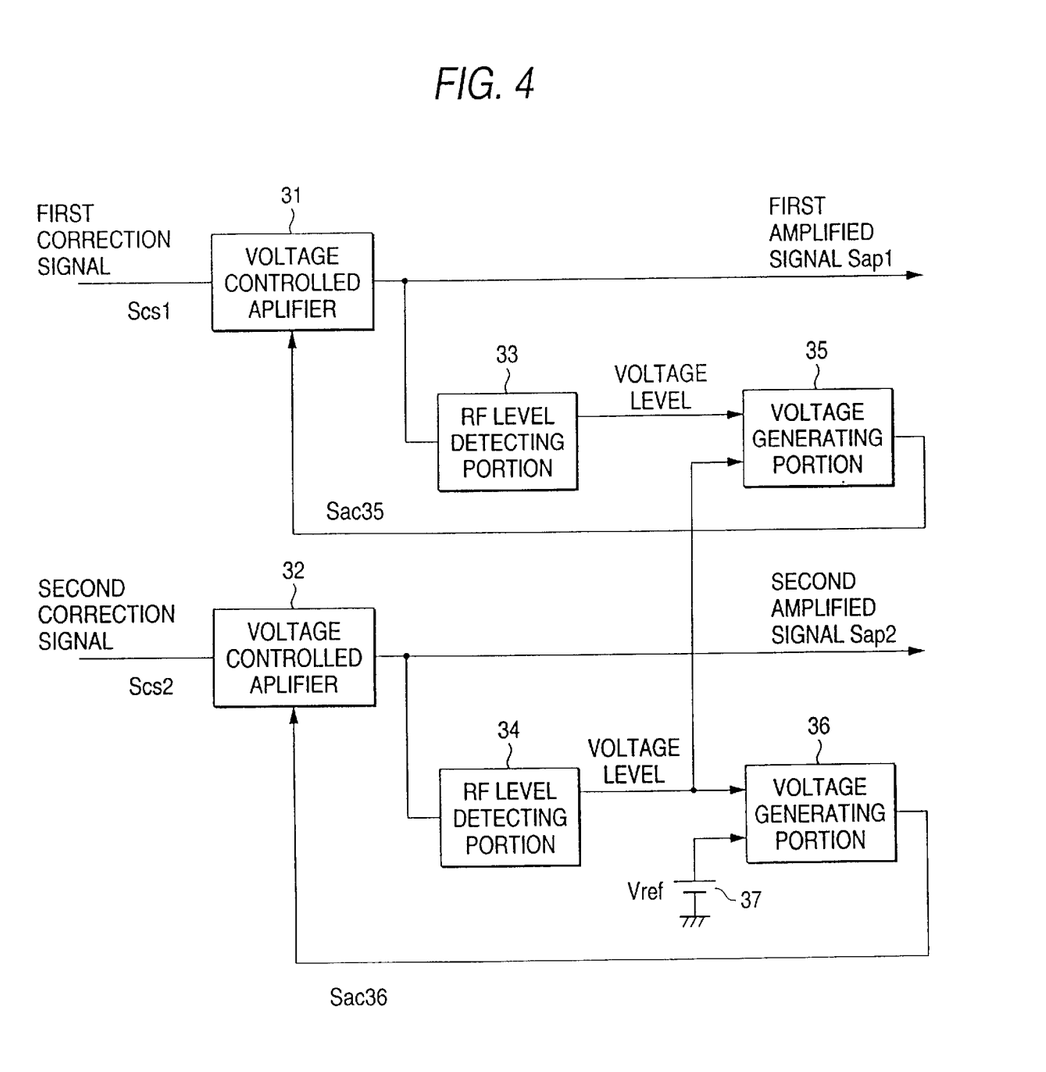
FIG. 4 is a block diagram showing the structure of an RF level correction circuit 3 according to the embodiment of the present invention.

FIG. 4 is a block diagram showing the RF level correction circuit.

A first voltage controlled amplifier 31 amplifies the first correction signal Scs1 supplied from the RF pit correction circuit 2 with the amplification factor represented by an amplification-factor control signal Sac35 supplied from a first voltage generating portion 35 to be described later.

Thus, a first amplified signal Sap1 is generated so as to be output to the first RF-signal-level detecting portion 33 and the following radial push-pull signal generating circuit 4.

The RF-signal-level detecting portion 33 which is the first amplitude extracting means comprises a time-constant circuit having a sufficiently long time constant with respect to intervals of signals corresponding to the long pits of the first divided RF signal SDRF1. The RF-signal-level detecting portion 33 detects an average level of the amplitude level of the supplied first amplifying signal Sap1 to output it as a first average signal to the first voltage generating portion 35 which is a first amplitude adjustment means.

The first voltage generating portion 35 comprises a so-called differential circuit which calculates the difference between the average level supplied from the RF-signal-level detecting portion 33 and a second average signal supplied from the second RF-signal-level detecting portion 34. Thus, the first voltage generating portion 35 supplies an obtained difference signal to the first voltage controlled amplifier 31 as the amplification control signal Sac35.

On the other hand, the second voltage controlled amplifier 32 amplifies the second correction signal Scs2 supplied from the RF pit correction circuit 2 with the amplification factor represented by the amplification control signal Sac36 supplied from the second voltage generating portion 36. Thus, the second voltage controlled amplifier 32 generates the second amplified signal Sap2 to output it to the second RF-signal-level detecting portion 34 and the radial push-pull circuit 4.

The RF-signal-level detecting portion 34 which is the second amplitude extracting means comprises a time-constant circuit having a sufficiently long time constant with respect to the intervals of signals corresponding to the long pits of the second divided RF signal SDRF2. The RF-signal-level detecting portion 34 detects an average level of the amplitude level of the supplied second amplified signal Sap2 to output it, as the second average signal, to the second voltage generating portion 36 which is the second amplitude adjustment means.

The second voltage generating portion 36 calculates the difference between the average level supplied from the RF-signal-level detecting portion 34 and the reference level Vref set by the reference-level setting unit 37. Thus, the second voltage generating portion 36 supplies the obtained differential signal to the second voltage controlled amplifier 32 as the amplification control signal Sac36. Therefore, the amplification factor of the second voltage controlled amplifier 32 is controlled in such a manner that the second average signal coincides with the reference level Vref set by the second voltage generating portion 36.

As described above, the amplification factor of the voltage controlled amplifier 31 is controlled in such a manner that the first average signal coincides with the second average signal output from the second RF-signal-level detecting portion 34. Therefore, the first voltage controlled amplifier 31 and the second voltage controlled amplifier 32 amplify the first and second correction signals Scs1 and Scs2 with the same amplification factor regulated with the reference level Vref. As a result, the amplification factor of each of the first voltage controlled amplifier 31 and the second voltage controlled amplifier 32 is determined in such a manner that the average level of the amplitude of each of the first amplified signal Sap1 and that of the second amplified signal Sap2 is the predetermined amplitude level regulated by the reference level Vref.

Figure 5:
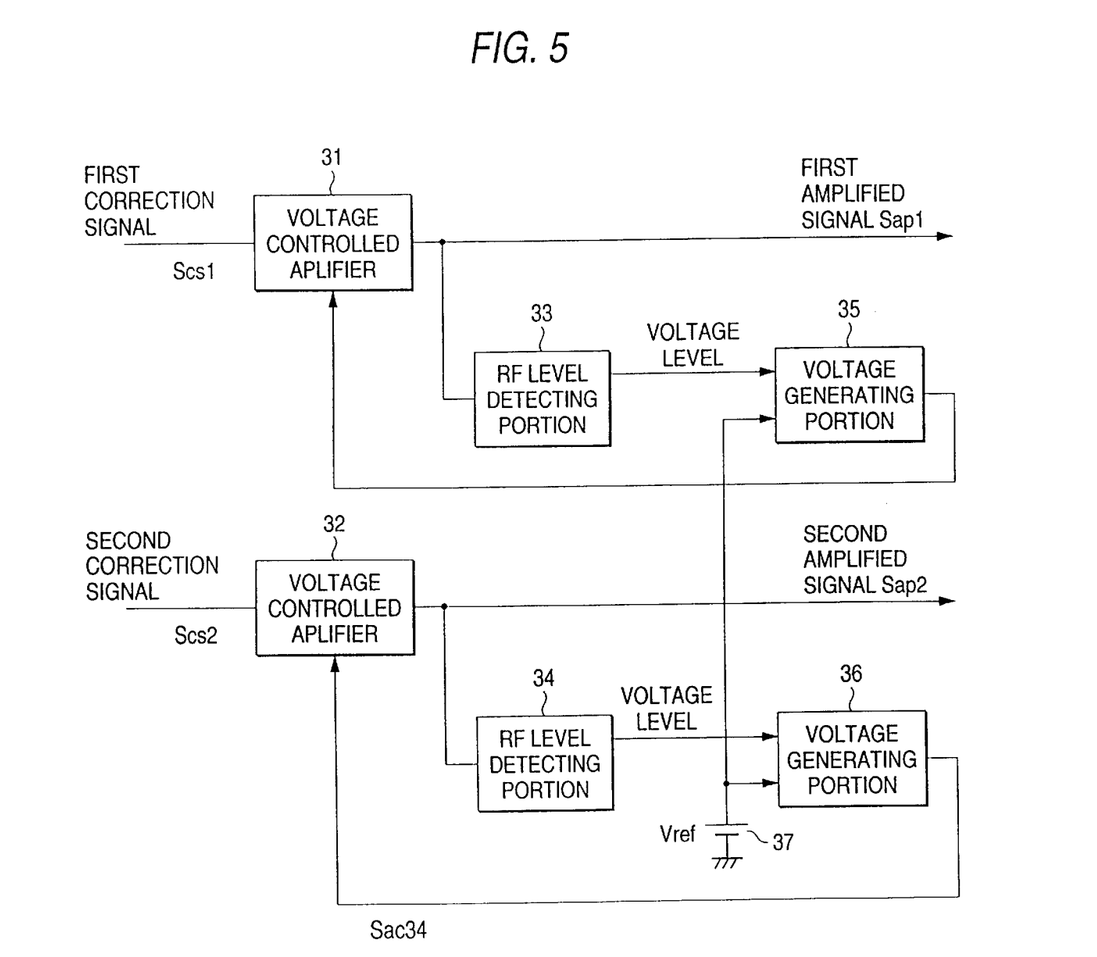
FIG. 5 is a block diagram showing the structure of an RF level correction circuit according to another embodiment of the present invention.

The function of the RF level correction circuit 3 can be realized by a RF level correction circuit 3' structured as shown in FIG. 5. As an alternative to input of the second average signal to the voltage generating portion 35 of the RF level correction circuit 3, the reference level Vref which is the output of the reference-level setting unit 37 may directly be input.

As a result of the foregoing structure, the RF level correction circuit 3' outputs, to the following radial push-pull circuit 4, the first amplified signal Sap1 and the second amplified signal Sap2 having the same average amplitude level regulated by the reference level Vref.

The radial push-pull circuit 4 comprises a so-called differential amplifier which extracts a difference signal between the supplied first amplified signal Sap1 and the second amplified signal Sap2. At this time, the first amplified signal Sap1 and the second amplified signal Sap2 have been adjusted by the RF level correction circuit 3 such that their average levels coincide with each other. Therefore, unnecessary components except for the signal components of the LPP, for example, noise components which are generating owing to recording pits formed on the pregrooves are always contained in the first amplified signal Sap1 and the second amplified signal Sap2 at the same ratio (the same amplitude level). Therefore, the radial push-pull circuit 4 outputs the differential signal (the radial-pushed signal which) in which components except for the LPP and wobble signal are compensated. As a result, a composite signal having a satisfactory S/N and a form in which the signal components of the LPP are superimposed on the wobble signals can be obtained. The wobble signal components leaked and introduced, as crosstalk, from the adjacent groove tracks are not always uniformly introduced into the first divided RF signal and the second divided RF signal SDRF2. Therefore, the foregoing signal components are not always compensated. The radial push-pull signal Srpp is output to the following binary-coding circuit 5 so that the LPP signal is detected.

Figure 6:
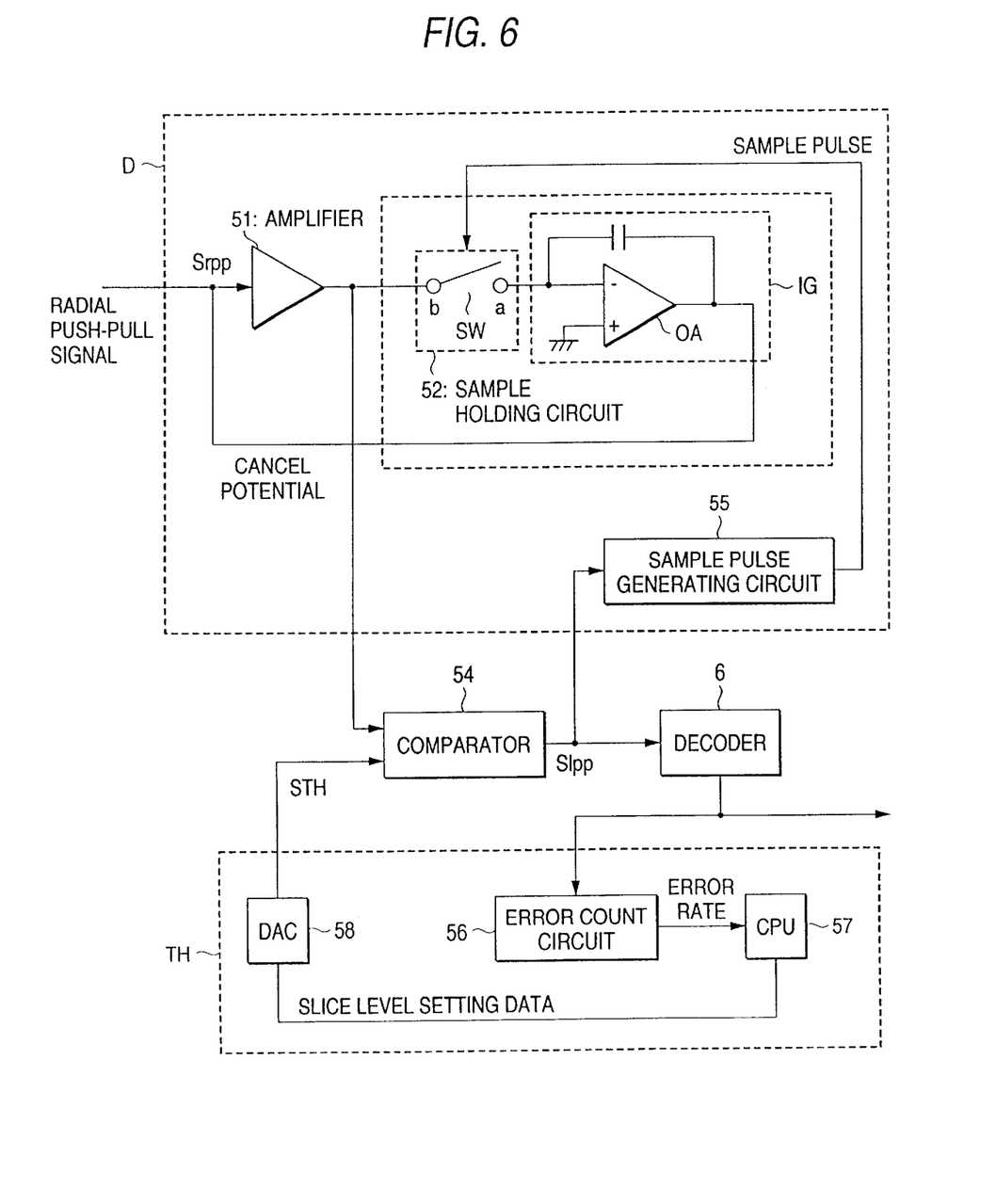
FIG. 6 is a block diagram showing a binary-coding circuit according to the embodiment of the present invention.
Figure 8A:
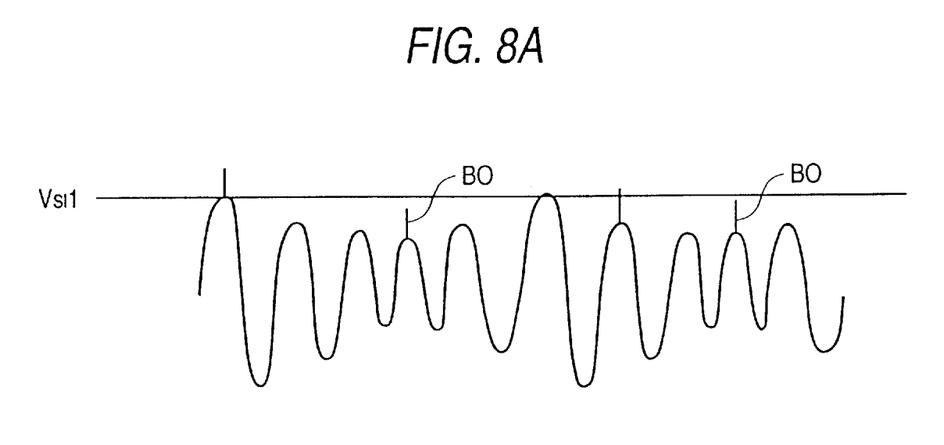
FIGS. 8A and 8B are graphs showing an example of an LPP signal superimposed on a wobble signal.
Figure 8B:
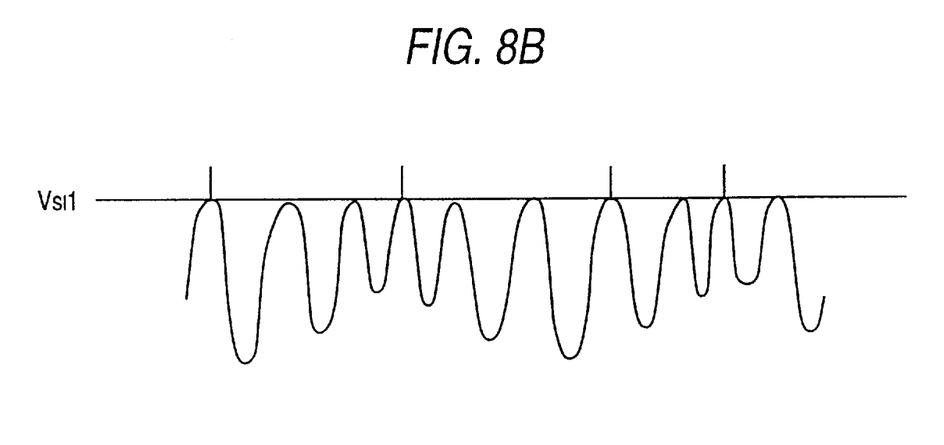

Referring to FIGS. 6 and 8, the operation of the binary-coding circuit 5 for detecting the LPP signal will now be described. The binary-coding circuit 5 accurately extracts the LPP from the radial push-pull signal Srpp which is the composite signal on which an influence of the crosstalk caused from the wobble signal in the adjacent pregrooves has been exerted.

FIG. 6 is a block diagram showing the binary-coding circuit.

The binary-coding circuit 5 incorporates a DC reproducing circuit D, which is the DC clamping means, constituted by an amplifier 51, a sample holding circuit 52 and a sample pulse generating circuit 55; a slice-level setting circuit TH constituted by an error counter 56, a CPU 57 and a DAC 58; and a comparator 54 which is a prepit detection means for making a comparison between the radial push-pull signal Srpp and the slice level Sth supplied from the slice-level setting circuit TH to generate a binary signal which is the LPP signal.

The sample holding circuit 52 incorporates a switch SW and an integrating circuit IG. The integrating circuit IG comprises an operation amplifier OA. A non-inverted input terminal of the operation amplifier OA is grounded. Moreover, an integrating capacitor is connected between the inverted input terminal and the output terminal. The inverted input terminal is connected to a contact a of contacts of the switch SW.

The sample holding circuit 52 in the DC reproducing circuit D holds the radial push-pull signal Srpp supplied through the amplifier 51 at the timing of the sample pulse signal supplied from a sample pulse generating circuit 55 to be described later. That is, the switch SW is closed only in a period in which the sample pulse signal is H level. Thus, the amplitude value of the radial push-pull signal Srpp is held in the integrating circuit IG. An output of the integrating circuit IG is superimposed on the radial push-pull signal Srpp which is a signal input to the amplifier 51.

The sample pulse generating circuit 55 comprises, for example, a mono-multi vibrator which generates sample pulses in synchronization with the first transition timing of the LPP supplied from the comparator 54.

Figure 7:
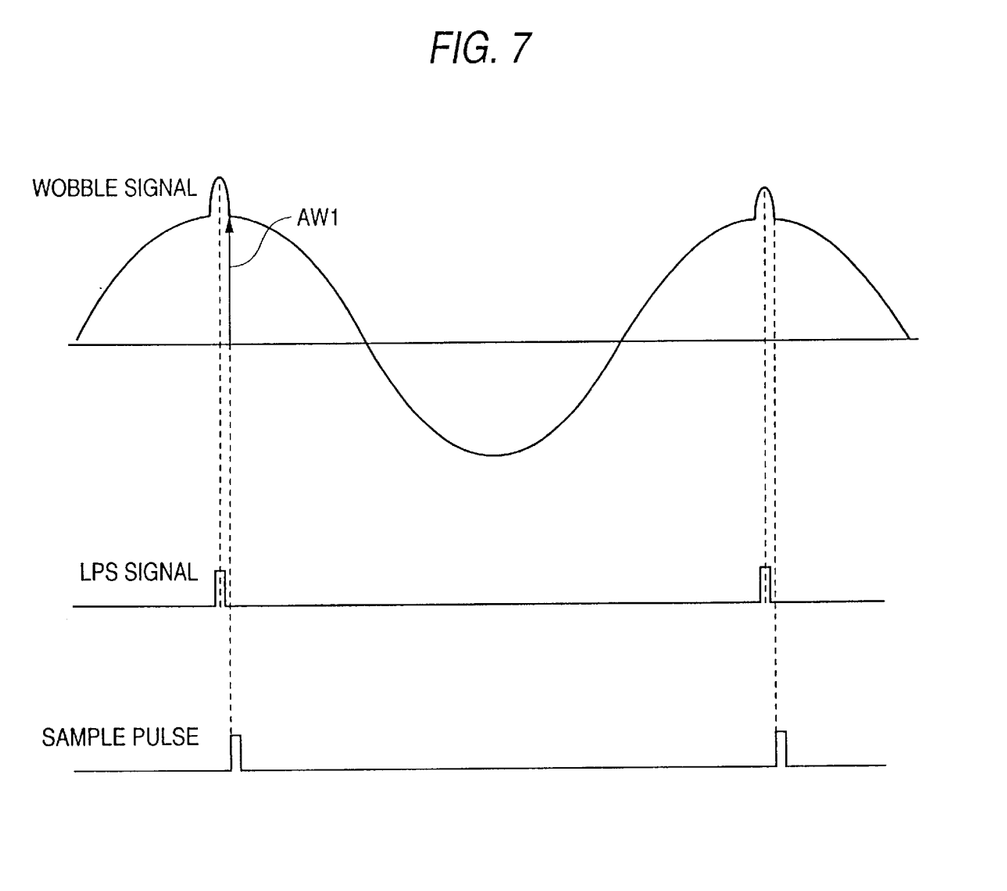
FIG. 7 is a graph showing timing of LPP and that of a sample pulse.

Therefore, as shown in FIG. 7, the sample holding circuit 52 holds the amplitude level of the wobble signal in the immediately rear of the superimposition position of prepit of the radial push-pull signal Srpp, that is, amplitude value Aw1 which is substantially the same as the amplitude value on the base line of the wobble signal on which the prepit has been superimposed.

The integrating circuit IG has the grounded non-inverted input terminal. Therefore, also the inverted input terminal acts to have an imaginary ground level. Thus, the integrating circuit IG outputs a signal having a characteristic which is inverse to the level Aw1 held by the capacitor C. That is, the amplitude level sampled from the radial push-pull signal Srpp, that is, a signal which cancels the amplitude value Aw1 on the base line on which the prepit has been superimposed is output. Thus, as shown in FIG. 8B, the amplifier 51 outputs, to the comparator 54, a signal which has been DC-clamped in such a manner that the peak value of the wobble signal component of the Srpp is substantially zero level.

On the other hand, the error counter 56 of the slice-level setting circuit TH is supplied with an error detection signal which is detected when the decoder 6 decodes the LPP signal SLP output from the comparator 54. The error counter 56 counts the number of the error detection signals to output the total number of errors in predetermined block units (for example, IECC (Error Collect Code) block) to the CPU 57 as an error rate. The CPU 57 resets the slice level with which the foregoing error rate can be minimized to output the slice level to the DAC 58. If the slice level which has be set last is higher than the second last slice level and the error rate realized owing to the last slice level is higher than the error rate owing to the second last slice level, the slice level which is lower than the second last slice level by a predetermined value is set. The foregoing resetting operation is repeated to finally determine a slice level with which the error rate is made to be lowest.

The DAC 58 converts data for setting the slice level supplied from the CPU 57 into the corresponding voltage level to output the voltage level to the reference-level input terminal of the comparator 54.

As a result of employment of the above-mentioned structure, the binary-coding circuit 5 is able to stably detect the LPP signal even from a radial push-pull on which an influence of crosstalk has been exerted. That is, the radial push-pull signal Srpp has the amplitude which has been changed owing to the interference caused from leakage and introduction of the wobble component from the adjacent pregrooves, as shown in FIG. 8A. When the radial push-pull signal Srpp having the varied amplitude is compared with, for example, a fixed slice level Vs11, prepit B0 which is lower than the foregoing slice level Vs11 cannot be detected. The DC reproducing circuit D fixes (shifts the level) the amplitude value adjacent to a phase of 90° (adjacent to a maximum amplitude for each period of the wobble signal) of the wobble signal on which the LPP is superimposed to, for example, the zero level, as shown in FIG. 8B. Therefore, when a comparison with the fixed slice level Vs11 is made, all of the prepits can be detected. Since the slice level can be optimized in accordance with the error rate of the LPP, the reliability of the detected LPP can be improved.

As described above, according to the present invention there is provided the prepit detecting apparatus which uses the optical recording medium having the information recording tracks on which information is recorded and the guide tracks each of which guides a light beam to the information recording track and on which the prepits for saving preinformation are formed such that the light beam is applied to the information track of the optical recording medium, the prepit detecting apparatus comprising: the light receiving means divided into a first divided light receiving portion and the second divided light receiving portion divided along an optically parallel division line in a direction of tangent of the information tracks and arranged to receive reflected light of the light beam with which the optical recording medium has been irradiated; and the difference calculator for calculating the difference between a first read signal output from the first divided light receiving portion and a second read signal output from the second divided light receiving portion so that the prepit is detected in response to a differential signal output from the difference calculator, wherein the difference calculator incorporates the amplitude correction means for causing the amplitudes of the first read signal and the second read signal to coincide with a reference level, and the difference between the first read signal and the second read signal corrected by the amplitude correction means is calculated. Therefore, when an LPP signal is extracted during reproduction of a write-once recording medium, influences of recording pits and deviation in the quantity of light in the radial direction can be minimized.

The prepit detecting apparatus of the present invention has the structure that the amplitude correction means incorporates the first amplitude extracting means for extracting an average amplitude level of the first read signal, the second amplitude extracting means for extracting an average amplitude level of the second read signal, the first comparison means for comparing an output of the first amplitude extracting means and an output of the second amplitude extracting means with each other, the second comparison means for comparing an output of the second amplitude extracting means and the reference level with each other, the first amplitude adjustment means for adjusting the amplitude of the first read signal in accordance with an output of the first comparison means and second adjustment means for adjusting the amplitude of the second read signal in accordance with an output of the second comparison means. Therefore, if the optical axis of light which is applied from the pickup to the surface of an optical recording medium is deviated in the radial direction, accurate prepit information can be obtained with a simple structure.

The prepit detecting apparatus of the present invention has the structure that the amplitude correction means incorporates the first amplitude extracting means for extracting an average amplitude level of the first read signal, the second amplitude extracting means for extracting an average amplitude level of the second read signal, the first comparison means for comparing an output of the first amplitude extracting means with a reference level, the second comparison means for comparing an output of the second amplitude extracting means with the reference level, the first amplitude adjustment means for adjusting the amplitude of the first read signal in accordance with an output of the first comparison means and the second adjustment means for adjusting the amplitude of the second read signal in accordance with an output of the second comparison means. Therefore, if the optical axis of light which is applied from the pickup to the surface of an optical recording medium is deviated in the radial direction, accurate prepit information can be obtained with a simple structure.

The prepit detecting apparatus of the present invention and arranged to use the optical recording medium which has information recording tracks on which information is recorded, which is wobbled in response to a wobble signal having a predetermined frequency and which has the guide tracks for guiding a light beam to the information recording track having prepits for saving pre-information and incorporating the light receiving means divided into the first divided light receiving portion and the second divided light receiving portion divided along an optically parallel division line in a direction of tangent of the information tracks and arranged to receive reflected light of the light beam with which the optical recording medium has been irradiated and the difference calculator for calculating the difference between the first read signal output from the first divided light receiving portion and the second read signal output from the second divided light receiving portion so that the prepit is detected in response to the differential signal output from the difference calculator, the prepit detecting apparatus comprising: the DC clamping means for clamping the differential signal output from the difference calculator with a DC level; and the prepit detecting means which compares an output from the clamping means and a reference slice level with each other to detect the prepit signal, wherein the DC clamping means clamps the wobble signal component corresponding to detection timing of the prepit signal detected by the prepit detecting means to the predetermined DC level.

The prepit detecting apparatus of the present invention has the structure that the DC clamping means incorporates the relay means for relaying the differential signal at detection timing of the prepit signal, the integrating circuit for integrating the differential signal supplied through the relay means and the superimposing means for superimposing an output of the integrating circuit on the differential signal, and the integrating circuit incorporates the calculation amplifier having the non-inverted input terminal to which a predetermined DC level is input and the integrating capacitor connected between the output terminal of the calculation amplifier and the inverted input terminal. Therefore, the base line of the LPP signal is varied vertically owing to superimposition on the wobble signal, an accurate LPP signal can be obtained.

What is claimed is:

1. A prepit detecting apparatus which uses an optical recording medium having information recording tracks on which information is recorded and guide tracks each of which guides a light beam to the information recording track and on which prepits for saving pre-information are formed such that the light beam is applied to said information track of said optical recording medium, said prepit detecting apparatus comprising:

light receiving means divided into a first divided light receiving portion and a second divided light receiving portion divided along an optically parallel division line in a direction of tangent of the information tracks and arranged to receive reflected light of the light beam with which the optical recording medium has been irradiated; and a difference calculator for calculating the difference between a first read signal output from said first divided light receiving portion and a second read signal output from said second divided light receiving portion so that the prepit is detected in response to a differential signal output from said difference calculator;

wherein said difference calculator incorporates amplitude correction means for causing the amplitudes of the first read signal and the second read signal to coincide with a reference level, and the difference between the first read signal and the second read signal corrected by said amplitude correction means is calculated.

2. A prepit detecting apparatus according to claim 1, wherein said amplitude correction means incorporates first amplitude extracting means for extracting an average amplitude level of the first read signal, second amplitude extracting means for extracting an average amplitude level of the second read signal, first comparison means for comparing an output of said first amplitude extracting means and an output of said second amplitude extracting means with each other, second comparison means for comparing an output of said second amplitude extracting a means and the reference level with each other, first amplitude adjustment means for adjusting the amplitude of the first read signal in accordance with an output of said first comparison means and said second adjustment means for adjusting the amplitude of the second read signal in accordance with an output of said second comparison means.

3. A prepit detecting apparatus according to claim 1, wherein said amplitude correction means incorporates first amplitude extracting means for extracting an average amplitude level of the first read signal, second amplitude extracting means for extracting an average amplitude level of the second read signal, first comparison means for comparing an output of said first amplitude extracting means with a reference level, second comparison means for comparing an output of said second amplitude extracting means with a reference level, first amplitude adjustment means for adjusting the amplitude of the first read signal in accordance with an output of said first comparison means and second adjustment means for adjusting the amplitude of the second read signal in accordance with an output of said second comparison means.

4. A prepit detecting apparatus arranged to use an optical recording medium which has information recording tracks on which information is recorded, which is wobbled in response to a wobble signal having a predetermined frequency and which has guide tracks for guiding a light beam to said information recording track having prepits for saving pre-information and incorporating light receiving means divided into a first divided light receiving portion and a second divided light receiving portion divided along an optically parallel division line in a direction of tangent of the information tracks and arranged to receive reflected light of the light beam with which the optical recording medium has been irradiated and a difference calculator for calculating the difference between a first read signal output from said first divided light receiving portion and a second read signal output from said second divided light receiving portion so that the prepit is detected in response to a differential signal output from said difference calculator, said prepit detecting apparatus comprising:

DC clamping means for clamping the differential signal output from said difference calculator with a DC level; and prepit detecting means which compares an output from said clamping means and a reference slice level with each other to detect the prepit signal;

wherein said DC clamping means clamps the wobble signal component corresponding to detection timing of the prepit signal detected by said prepit detecting means to the-predetermined DC level.

5. A prepit detecting apparatus according to claim 4, wherein said DC clamping means incorporates relay means for relaying the differential signal at detection timing of the prepit signal, an integrating circuit for integrating the differential signal supplied through said relay means and superimposing means for superimposing an output of said integrating circuit on the differential signal, and said integrating circuit incorporates a calculation amplifier having a non-inverted input terminal to which a predetermined DC level is input and an integrating capacitor connected between an output terminal of said calculation amplifier and an inverted input terminal.

6. A prepit detecting apparatus which uses an optical recording medium having information recording tracks on which information is recorded and guide tracks each of which guides a light beam to the information recording track and on which prepits for saving pre-information are formed such that the light beam is applied to said information track of said optical recording medium, said prepit detecting apparatus comprising:

a light receptor divided into a first divided light receiving portion and a second divided light receiving portion divided along an optically parallel division line in a direction of tangent of the information tracks and arranged to receive reflected light of the light beam with which the optical recording medium has been irradiated; and a difference calculator for calculating the difference between a first read signal output from said first divided light receiving portion and a second read signal output from said second divided light receiving portion so that the prepit is detected in response to a differential signal output from said difference calculator;

wherein said difference calculator incorporates an amplitude correction unit for causing the amplitudes of the first read signal and the second read signal to coincide with a reference level, and the difference between the first read signal and the second read signal corrected by said amplitude correction unit is calculated.

7. A prepit detecting apparatus according to claim 1, wherein said amplitude correction unit incorporates a first amplitude extracting unit for extracting an average amplitude level of the first read signal, a second amplitude extracting unit for extracting an average amplitude level of the second read signal, a first comparison unit for comparing an output of said first amplitude extracting unit and an output of said second amplitude extracting unit with each other, a second comparison unit for comparing an output of said second amplitude extracting unit and the reference level with each other, a first amplitude adjustment unit for adjusting the amplitude of the first read signal in accordance with an output of said first comparison unit, and a second adjustment unit for adjusting the amplitude of the second read signal in accordance with an output of said second comparison unit.

8. A prepit detecting apparatus according to claim 1, wherein said amplitude correction unit incorporates a first amplitude extracting unit for extracting an average amplitude level of the first read signal, a second amplitude extracting unit for extracting an average amplitude level of the second read signal, a first comparison unit for comparing an output of said first amplitude extracting unit with a reference level, a second comparison unit for comparing an output of said second amplitude extracting unit with a reference level, a first amplitude adjustment unit for adjusting the amplitude of the first read signal in accordance with an output of said first comparison unit, and a second adjustment unit for adjusting the amplitude of the second read signal in accordance with an output of said second comparison means.

9. A prepit detecting apparatus arranged to use an optical recording medium which has information recording tracks on which information is recorded, which is wobbled in response to a wobble signal having a predetermined frequency and which has guide tracks for guiding a light beam to said information recording track having prepits for saving pre-information and incorporating a light receptor divided into a first divided light receiving portion and a second divided light receiving portion divided along an optically parallel division line in a direction of tangent of the information tracks and arranged to receive reflected light of the light beam with which the optical recording medium has been irradiated and a difference calculator for calculating the difference between a first read signal output from said first divided light receiving portion and a second read signal output from said second divided light receiving portion so that the prepit is detected in response to a differential signal output from said difference calculator, said prepit detecting apparatus comprising:

a DC clamping unit for clamping the differential signal output from said difference calculator with a DC level; and a prepit detector which compares an output from said DC clamping unit and a reference slice level with each other to detect the prepit signal;

wherein said DC clamping unit clamps the wobble signal component corresponding to detection timing of the prepit signal detected by said prepit detector to the predetermined DC level.

10. A prepit detecting apparatus according to claim 4, wherein said DC clamping unit incorporates a relay for relaying the differential signal at detection timing of the prepit signal, an integrating circuit for integrating the differential signal supplied through said relay and a superimposing unit for superimposing an output of said integrating circuit on the differential signal, and said integrating circuit incorporates a calculation amplified having a non-inverted input terminal to which a predetermined DC level is input and an integrating capacitor connected between an output terminal of said calculation amplifier and an inverted input terminal.

* * * * *